US008392190B2

(12) United States Patent
Chen et al.

(10) Patent No.: US 8,392,190 B2
(45) Date of Patent: Mar. 5, 2013

(54) SYSTEMS AND METHODS FOR ASSESSMENT OF NON-NATIVE SPONTANEOUS SPEECH

(75) Inventors: Lei Chen, Lawrenceville, NJ (US); Klaus Zechner, Princeton, NJ (US); Xiaoming Xi, Princeton, NJ (US)

(73) Assignee: Educational Testing Service, Princeton, NJ (US)

( * ) Notice: Subject to any disclaimer, the term of this patent is extended or adjusted under 35 U.S.C. 154(b) by 598 days.

(21) Appl. No.: 12/628,611

(22) Filed: Dec. 1, 2009

(65) Prior Publication Data

US 2010/0145698 A1 Jun. 10, 2010

Related U.S. Application Data

(60) Provisional application No. 61/118,952, filed on Dec. 1, 2008.

(51) Int. Cl.
*G10L 15/00* (2006.01)
(52) U.S. Cl. .................................................. 704/256.1
(58) Field of Classification Search ................. 704/256.1
See application file for complete search history.

(56) References Cited

U.S. PATENT DOCUMENTS

| | | | | |
|---|---|---|---|---|
| 6,963,837 | B1 * | 11/2005 | Finke et al. | 704/256 |
| 7,488,886 | B2 * | 2/2009 | Kemp | 84/609 |
| 7,689,404 | B2 * | 3/2010 | Khasin | 704/1 |
| 7,826,945 | B2 * | 11/2010 | Zhang et al. | 701/36 |
| 7,912,721 | B2 * | 3/2011 | Dow et al. | 704/270 |
| 7,983,913 | B2 * | 7/2011 | Seltzer et al. | 704/251 |

OTHER PUBLICATIONS

PhonePass Testing: Structure and Construct; Ordinate Corporation Technical Report; 1999.
Chen, Lei, et al.; Improved Pronunciation Features for Construct-driven Assessment of Non-native Spontaneous Speech; Annual Conference of the North American Chapter of the ACL; Jun. 2009; pp. 442-449.
Cucchiarini, Catia, et al.; Automatic Evaluation of Dutch Pronunciation by Using Speech Recognition Technology; Dept. of Lang. & Speech, Nijmegen University, The Netherlands.
Cucchiarinia, Catia, et al.; Using speech recognition technology to assess foreign speakers' pronunciation of Dutch; University of Nijmegen.
Franco, Horacio, et al.; The SRI EduSpeak System: Recognition and Pronunciation Scoring for Language Learning; Speech Technology and Research Laboratory, SRI International, Menlo Park, California.
Graff, David; The 1996 Broadcast News Speech and Language-Model Corpus; Linguistic Data Consortium; University of Pennsylvania.
Hacker, Christian, et al.; Pronunciation Feature Extraction; ATR Spoken Language Translation Res. Labs.; 2005; pp. 141-148.
Neumeyer, Leonardo, et al.; Automatic Scoring of Pronunciation Quality; Nov. 3, 1999.
Witt, Silke Maren; Use of Speech Recognition in Computer-assisted Language Learning; Newnham College, University of Cambridge; Nov. 18, 1999.

(Continued)

*Primary Examiner* — Susan McFadden
(74) *Attorney, Agent, or Firm* — Jones Day

(57) ABSTRACT

Computer-implemented systems and methods are provided for assessing non-native spontaneous speech pronunciation. Speech recognition on digitized speech is performed using a non-native acoustic model trained with non-native speech to generate word hypotheses for the digitized speech. Time alignment is performed between the digitized speech and the word hypotheses using a reference acoustic model trained with native-quality speech. Statistics are calculated regarding individual words and phonemes in the word hypotheses based on the alignment. A plurality of features for use in assessing pronunciation of the speech are calculated based on the statistics, an assessment score is calculated based on one or more of the calculated features, and the assessment score is stored in a computer-readable memory.

42 Claims, 13 Drawing Sheets

OTHER PUBLICATIONS

Zechner, Klaus, Bejar, Isaac; Towards Automatic Scoring of Non-Native Spontaneous Speech; Proc. of the Human Language Technology Conference, North American Chapter of the ACL; Jun. 2006; pp. 216-223.

Zechner, Klaus, et al.; SpeechRater: A Construct-Driven Approach to Scoring Spontaneous Non-Native Speech; Educational Testing Service, Princeton, NJ.

Moustroufas, N., Digalakis, V.; Automatic pronunciation evaluation of foreign speakers using unknown text; Dept. of Electronics and Computer Engineering, Technical University of Crete, Greece; Jun. 16, 2005; pp. 219-229.

Xi, Xiaoming, Higgins, Derrick, Zechner, Klaus, Williamson, David; Automated Scoring of Spontaneous Speech Using SpeechRater (SM) v 1.0; Educational Testing Service, Research Report RR-08-62; Princeton, NJ; 2008.

* cited by examiner

400 ⬉

| VARIABLE | MEANING |
|---|---|
| $L(x_i)$ | THE LIKELIHOOD OF WORD $x_i$ BEING SPOKEN GIVEN THE OBSERVED AUDIO SIGNAL |
| $t_i$ | THE DURATION OF WORD $i$ IN A RESPONSE |
| $T_s$ | THE DURATION OF THE ENTIRE RESPONSE |
| $T$ | $\sum_{i=1}^{n} t_i$, THE SUMMATION OF THE DURATION OF ALL WORDS, WHERE $T \leq T_s$ |
| $n$ | THE NUMBER OF WORDS IN A RESPONSE |
| $m$ | THE NUMBER OF LETTERS IN A RESPONSE |
| $R$ | $\frac{m}{T_s}$, THE FREQUENCY OF LETTERS (AS THE RATE OF SPEECH) |
| $v_i$ | VOWEL $i$ |
| $N_v$ | THE TOTAL NUMBER OF VOWELS |
| $P_{v_i}$ | THE DURATION OF VOWEL $v_i$ |
| $\bar{P}$ | THE AVERAGE VOWEL DURATION (ACROSS ALL VOWELS IN THE RESPONSE BEING SCORED) |
| $D_{v_i}$ | THE STANDARD AVERAGE DURATION OF VOWEL $v_i$ (ESTIMATED ON A NATIVE SPEECH CORPUS) |
| $\bar{D}$ | THE AVERAGED VOWEL DURATION (ON ALL VOWELS IN A NATIVE SPEECH CORPUS) |
| $S_{v_i}$ | $\lvert P_{v_i} - D_{v_i} \rvert$, DURATION SHIFT OF VOWEL $v_i$ (MEASURED AS THE ABSOLUTE VALUE OF THE DIFFERENCE BETWEEN THE DURATION OF VOWEL $v_i$ AND ITS STANDARD VALUE) |
| $Sn_{v_i}$ | $\left\lvert \frac{P_{v_i}}{\bar{P}} - \frac{D_{v_i}}{\bar{D}} \right\rvert$, NORMALIZED DURATION SHIFT OF VOWEL $v_i$ (MEASURED AS THE ABSOLUTE VALUE OF THE NORMALIZED DIFFERENCE BETWEEN THE DURATION OF VOWEL $v_i$ AND ITS STANDARD VALUE) |

Fig. 4A

| FEATURE | FORMULA | MEANING |
| --- | --- | --- |
| $L_1$ | $\sum_{i=1}^{n} L(x_i)$ | SUMMATION OF LIKELIHOODS OF ALL THE INDIVIDUAL WORDS |
| $L_2$ | $L_1/n$ | AVERAGE LIKELIHOOD ACROSS ALL WORDS |
| $L_3$ | $L_1/m$ | AVERAGE LIKELIHOOD ACROSS ALL LETTERS |
| $L_4$ | $L_1/T$ | AVERAGE LIKELIHOOD PER SECOND |
| $L_5$ | $\dfrac{\sum_{i=1}^{n} \dfrac{L(x_i)}{t_i}}{n}$ | AVERAGE LIKELIHOOD DENSITY ACROSS ALL WORDS |
| $L_6$ | $L_4/R$ | $L_4$ NORMALIZED BY THE RATE OF SPEECH |
| $L_7$ | $L_5/R$ | $L_5$ NORMALIZED BY THE RATE OF SPEECH |
| $\overline{S}$ | $\dfrac{\sum_{i=1}^{N_v} S_{v_i}}{N_v}$ | AVERAGE VOWEL DURATION SHIFTS |
| $\overline{Sn}$ | $\dfrac{\sum_{i=1}^{N_v} Sn_{v_i}}{N_v}$ | AVERAGE NORMALIZED VOWEL DURATION SHIFTS |

*Fig. 4B*

SYSTEMS AND METHODS FOR ASSESSMENT OF NON-NATIVE SPONTANEOUS SPEECH

This application claims priority to U.S. Provisional Application No. 61/118,952 filed on Dec. 1, 2008, entitled "Improved Pronunciation Features for Construct-Driven Assessment of Non-Native Spontaneous Speech," the entirety of which is herein incorporated by reference.

FIELD

The technology described herein relates generally to spoken language proficiency testing and more specifically to spoken language pronunciation proficiency testing.

BACKGROUND

Automated systems for evaluating highly predictable speech have emerged in the past decade due to the growing maturity of speech recognition and processing technologies. However, endeavors into automated scoring for spontaneous speech have been sparse given the challenge of both recognizing and assessing spontaneous speech.

A construct is a set of knowledge, skills, and abilities measured by a test. The construct of a speaking test may be embodied in the rubrics that human raters use to score the test. For example, the construct of communicative competence may consist of three categories: delivery, language use, and topic development. Delivery refers to the pace and the clarity of speech, including performance, on intonation, rhythm, rate of speech, and degree of hesitancy. Language use refers to the range, complexity, and precision of vocabulary and grammar use. Topic development refers to the coherence and fullness of the response.

The delivery aspect may be measured on four dimensions: fluency, intonation, rhythm, and pronunciation. Pronunciation may be defined as the act or manner of articulating syllables, words and phrases including their associated vowels, consonants, and word-level stresses. Pronunciation is a factor that impacts the intelligibility and perceived comprehensibility of speech. Because pronunciation plays an important role in speech perception, features for assessing pronunciation are worth exploring, especially in the area of measuring spontaneous speech, which remains largely neglected.

SUMMARY

In accordance with the teachings herein, computer-implemented systems and methods are provided for assessing spontaneous speech pronunciation, e.g. of non-native language speakers. Word hypotheses may be generated by performing speech recognition on digitized speech using a non-native acoustic model trained with non-native speech. A time alignment may be performed between the digitized speech and the word hypotheses utilizing a reference acoustic model trained with native quality speech to associate word hypotheses with corresponding sounds of the digitized speech. Statistics regarding individual words and phonemes of the word hypotheses may be calculated using the processing system based on the alignment. A plurality of features for use in assessing pronunciation of the speech may be calculated based on the statistics using the processing system, an assessment score may be calculated based on the one or more calculated features, and the assessment score may be stored in a computer-readable memory.

As another example, a computer-implemented system for assessing spontaneous speech pronunciation may include a processing system and a computer-readable memory programmed with instructions for causing the processing system to perform steps that include generating word by performing speech recognition on digitized speech using a non-native acoustic model trained with non-native speech. A time alignment may be performed between the digitized speech and the word hypotheses utilizing a reference acoustic model trained with native quality speech to associate word hypotheses with corresponding sounds of the digitized speech. Statistics regarding individual words and phonemes of the word hypotheses may be calculated using the processing system based on the alignment. A plurality of features for use in assessing pronunciation of the speech may be calculated based on the statistics using the processing system, an assessment score may be calculated based on the one or more calculated features, and the assessment score may be stored in a computer-readable memory.

As a further example, a computer-readable memory comprising computer-readable instructions that when executed cause a processing system to perform steps that include generating word by performing speech recognition on digitized speech using a non-native acoustic model trained with non-native speech. A time alignment may be performed between the digitized speech and the word hypotheses utilizing a reference acoustic model trained with native quality speech to associate word hypotheses with corresponding sounds of the digitized speech. Statistics regarding individual words and phonemes of the word hypotheses may be calculated using the processing system based on the alignment. A plurality of features for use in assessing pronunciation of the speech may be calculated based on the statistics using the processing system, an assessment score may be calculated based on the one or more calculated features, and the assessment score may be stored in a computer-readable memory.

BRIEF DESCRIPTION OF THE DRAWINGS

FIG. 4A depicts a table of example features that may be calculated based on the measurements and other data contained within the alignment results, and FIG. 4B depicts a table that lists variables used in the feature table and their meanings.

DETAILED DESCRIPTION

Figure 1:
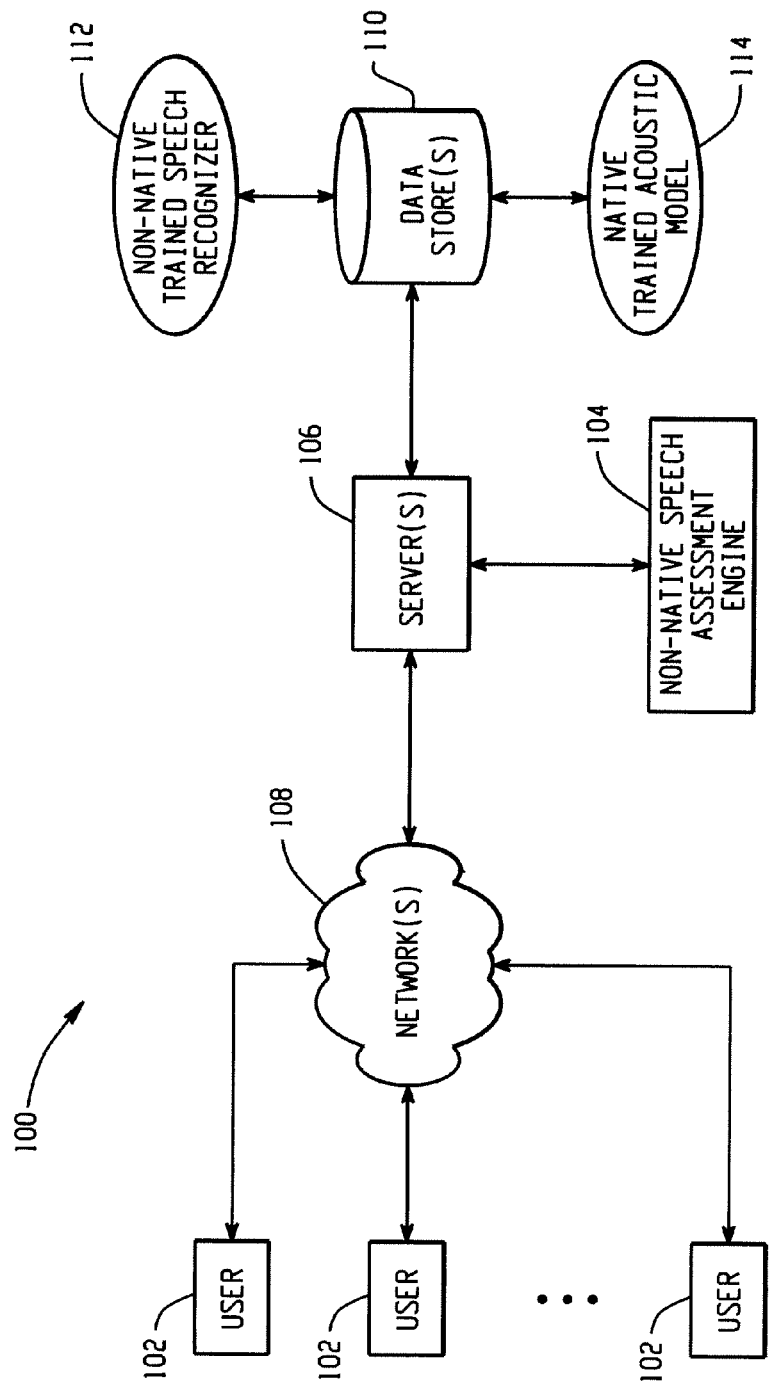
FIG. 1 depicts a computer-implemented environment wherein users can interact with a non-native speech assessment engine hosted on one or more servers through a network.

FIG. 1 depicts a computer-implemented system 100 wherein users 102 can interact with a non-native speech assessment engine 104 hosted on one or more servers 106 through a network 108. The speech assessment engine 104 can be used for assessing the pronunciation of s non-native language speaker, e.g., a speaker whose native language is Spanish but who is speaking in English so as to obtain an assessment of her English pronunciation. The non-native speech assessment engine 104 may be implemented in a wide variety of contexts. For example, a non-native speech assessment engine 104 may be used in providing an assessment of a non-native student speaking spontaneously. It may be desirable to measure the quality of the non-native student's speaking ability automatically using a computer, such as for an "English as a second language" exam. Conventional systems perform assessments with regard to delivery aspects of a student's speech via a student speaking a scripted text. This limitation to scripted texts is largely based on the difficulty in accurately recognizing spontaneous, non-native speech using a computer. However, such scripted speech assessment does not enable testing of other categories of a student's speaking ability such as language usage and topic development at the same time that delivery aspects are measured because a student makes no choices with respect to language usage or topic development when reading from a static script.

The non-native speech assessment engine 104 enables the assessment of delivery aspects and other aspects of a non-native speaker's spontaneous speech. For example, a person being evaluated may be prompted (e.g., by a computerized test question) to discuss their favorite animal. The person may respond by stating, "Cat are my favorite animal." The non-native speech assessment engine 104 is able to perform an analysis of the delivery of the person's answer as well as other aspects of the answer (e.g., the system can assess the grammar error based on the disagreement between the noun "cat" and verb "are" and can take that into account in providing a language use score).

With reference to FIG. 1, the engine 104 contains software operations or routines for assessing non-native spontaneous speech pronunciation. User computers 102 can interact with the engine 104 through a number of ways, such as over one or more networks 108. One or more servers 106 accessible through the network(s) 108 can host the non-native speech assessment engine 104. It should be understood that the non-native speech assessment engine 104 could also be provided on a stand-alone computer for access by a user. The non-native speech assessment engine 104 generates an assessment score for non-native spontaneous speech pronunciation utilizing two different acoustic models. The one or more servers 106 are responsive to one or more data stores 110 for providing input data to the non-native speech assessment engine 104. Among the data stored in the one or more data stores 110 may be computer-readable program code for implementing a speech recognizer that utilizes an acoustic model trained by non-native speech 112 as well as computer-readable program code for implementing an acoustic model trained by native or near native speech 114.

Figure 2:
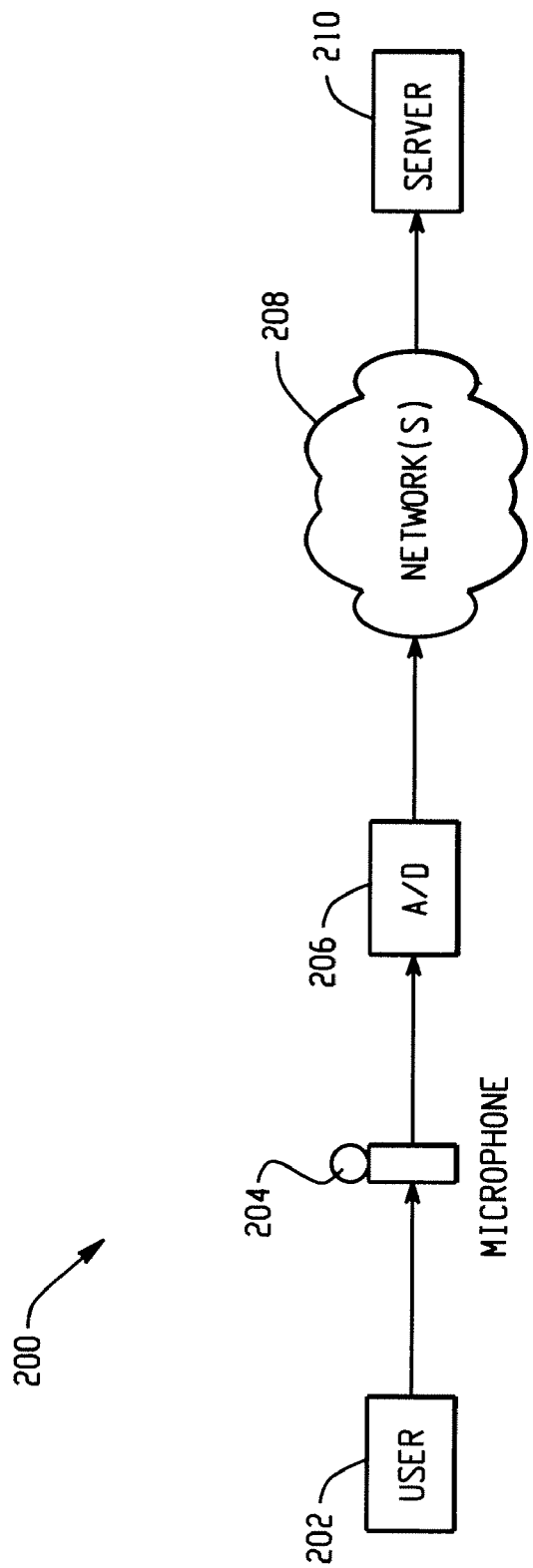
FIG. 2 is a block diagram depicting elements used for capturing speech from a person being evaluated.

FIG. 2 is a block diagram depicting elements used for capturing speech from a person being evaluated. A user 202 may be prompted to speak spontaneously into a microphone, telephone, or other sound receiver 204. For example, the user 202 may be prompted to discuss their favorite animal. The user 202 may say, "Cat are my favorite animal," into the microphone. The signal produced by the user 202 speaking into the microphone 204 is provided to a computer 205 containing an analog to digital (A/D) converter 206 that converts the analog signal received from the microphone 204 into a digital representation of that signal. The digitized signal output from the A/D converter 206 may be stored in computer 205 or transmitted to other computer systems for storage. For example, the digitized signal may be transported via a network 208 for storage on a server 210.

Figure 3:
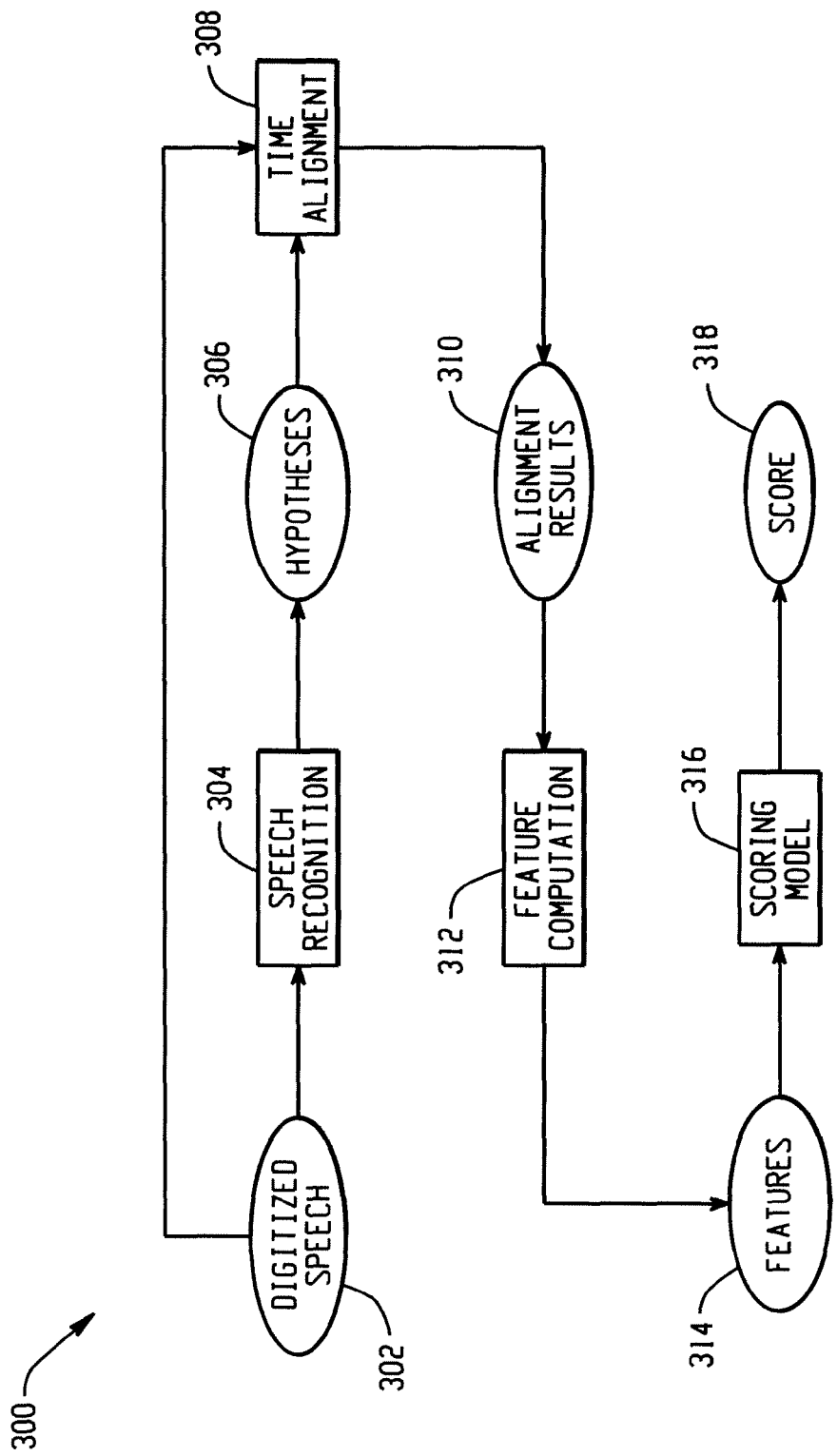
FIG. 3 is a flow diagram depicting a process for assessing non-native spontaneous speech pronunciation.

FIG. 3 is a flow diagram depicting a process for assessing spontaneous speech pronunciation of a non-native language speaker. Digitized speech 302 is received and provided for speech recognition 304. Speech recognition 304 generates word hypotheses 306 of the words in the digitized speech, which may be recorded in any suitable computer-readable storage medium or device. The word hypotheses are identifications of words that likely correspond to those of the digitized speech. For example, after a person speaks, "Cat are my favorite animal," into a microphone and that speech is digitized, the speech recognition will attempt to identify the words represented in the digitized format of the speech 302. After receiving digitized speech 302 of a non-native speaker stating, "Cat are my favorite animal," speech recognition 304 may output that same phrase, for example. However, speech recognition is not perfect, and the speech recognition 304 may output a different phase, such as "Cat are why favorite animal," as the word hypotheses 306 of the words contained within the digitized speech 302. To aid in recognizing non-native speech, speech recognition 304 may utilize an acoustic model trained with non-native speech to better fit non-native speakers' acoustic patterns to generate word hypotheses.

The digitized speech 302 and the word hypotheses 306 are then provided for time alignment 308, sometimes referred to as forced alignment. Alignment 308 creates a time-alignment between a string of words identified in the word hypotheses 306, as well as their phonemes contained therein, with the digitized speech signal. The alignment may be identified as a list of words or phonemes with their respective start and end times in the digitized speech signal 302. An acoustic model trained with native-quality speech may be utilized in alignment 308 to provide a reference model reflecting proper native speech characteristics. As used herein, native-quality speech means speech spoken by a native-language speaker or speech spoken by an experienced non-native language speaker whose pronunciation skill in the language of interest is commensurate with that of native language speakers. After aligning words and phonemes with the digitized speech, measurements regarding the digitized speech 302 may be extracted. For example, durations of certain vowel sounds, word durations, likelihoods of individual words or phonemes being spoken, or other statistics may be extracted once those phonemes are aligned with the digitized speech.

Those measurements for words and phonemes form a set of alignment results 310 that can be used in feature computation 312. Feature computation 312 calculates a plurality of features 314 based on the statistics contained in the alignment results 310. FIG. 4A depicts a table of example features that may be calculated based on the measurements and other data contained within the alignment results. FIG. 4B depicts a second table listing variables used to calculate the features in the feature table of FIG. 4A along with their meanings. For example, $\overline{S}$ represents average vowel duration shifts in a portion of digitized speech. $\overline{S}$ is calculated as $$\overline{S} = \frac{\sum_{i=1}^{N_v} S_{v_i}}{N_v},$$

where $N_v$ is the number of vowels in the portion of digitized speech and $S_{v_i}$ is calculated as $S_{v_i} = |P_{v_i} - D_{v_i}|$, where $P_{v_i}$ is the duration of the ith vowel in the portion of digitized speech and $D_{v_i}$ is the standard average duration of vowel $v_i$ that is estimated based on a native speech corpus used to train the acoustic model in the time alignment stage 308. In addition to the variables listed in FIG. 4B, the calculated features can also be based upon Hidden Markov Model probabilities, average phoneme duration, average word duration, phoneme duration distribution, word duration distribution, energy measurements, energy distributions, pitch measurements, pitch distributions, and pitch contours.

With reference back to FIG. 3, the calculated features 314 may then be provided to a scoring model 316 for providing an assessment score 318. The scoring model may be trained based on speech samples and associated scores provided by a human scorer. For example, the scoring model may be generated using a multiple regression procedure where coefficients are determined and those coefficients are applied to the calculated features 314. Those products can then be summed to generate an assessment score 318.

Figure 5:
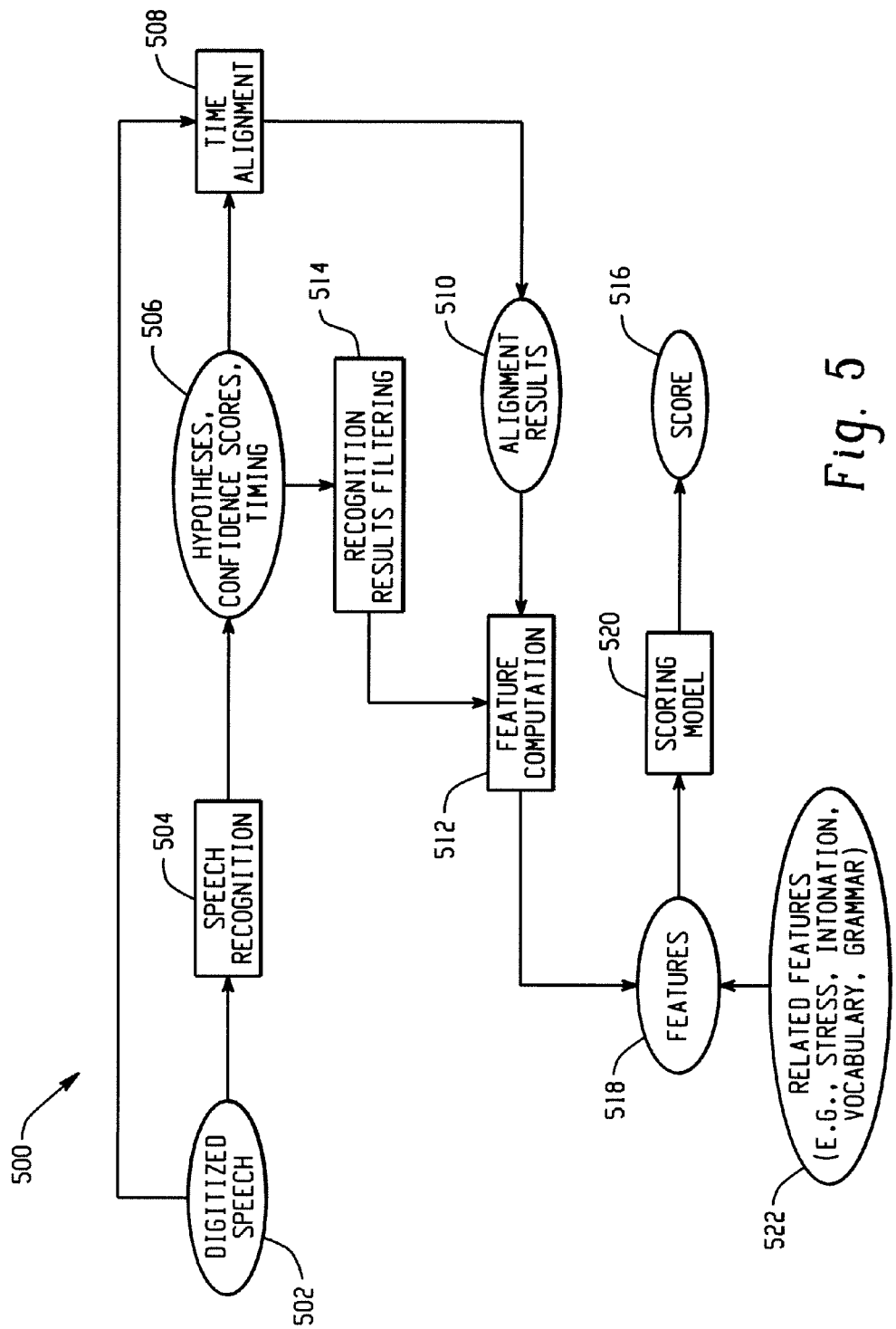
FIG. 5 is a flow diagram depicting a process for assessing non-native spontaneous speech pronunciation where certain words or phonemes in the digitized speech may be filtered such that they do not contribute to the assessment score.

FIG. 5 is a flow diagram depicting a process for assessing non-native spontaneous speech pronunciation where certain words or phonemes in the digitized speech may be filtered such that they do not contribute to the assessment score. Digitized speech 502 is received and undergoes speech recognition 504. In addition to generating word hypotheses 506 as to words identified in the digitized speech, the speech recognition 504 may provide other metrics with regard to the digitized speech. For example, the speech recognition 504 may, in addition to the word hypotheses, output timing metrics and confidence scores 506 related to the generated word hypotheses. The confidence scores may represent the reliability of the speech recognition 504, i.e., the reliability that an outputted hypothesis actually matches the word spoken in the digitized speech 502. For example, given a digitized speech sample that actually says, "Cat are my favorite animal," the speech recognition 504 may identify the word hypotheses "Cat are why favorite animal." The speech recognition 504 may further output confidence levels of: 99%, 95%, 62%, 87%, and 99%, respectively, for each of the five hypothesis words, for example. These confidence scores may be based on a variety of factors, as will be discussed further herein below with respect to FIG. 6. The confidence scores may be influenced by a variety of factors such as the quality of the speech, the accent of a speaker, noise levels, as well as others.

The digitized speech 502 and the word hypotheses and other metrics 506 identified by the speech recognition 504 are provided for time alignment 508. The time alignment 508 creates a time-alignment between a string of words identified in the word hypotheses 506, as well as their phonemes contained therein, with the digitized speech signal. The alignment results 510 are provided for feature computation 512. Feature computation 512 may also be influenced by recognition results filtering 514 provided based on the confidence scores 506 assigned by the speech recognition 504. The recognition results filtering 514 may identify words or phonemes that should not be considered in generating an assessment score 516. For example, the recognition results filtering 514 may identify one or more words for which features should not be calculated 512 based on their low confidence scores. The one or more excluded words would not be included in calculations such as in the duration of the entire response, $T_s$, the number of words in a response, n, or the calculation of other features 518.

The calculated features 518 are provided to a scoring model 520 that calculates an assessment score 516 based on the features. In addition to considering the pronunciation related features 518, the scoring model may also consider other factors related to the received speech. For example, the scoring model may also consider metrics related to word stress, intonation, vocabulary, grammar, and other facets in computing an assessment score 516.

Figure 6:
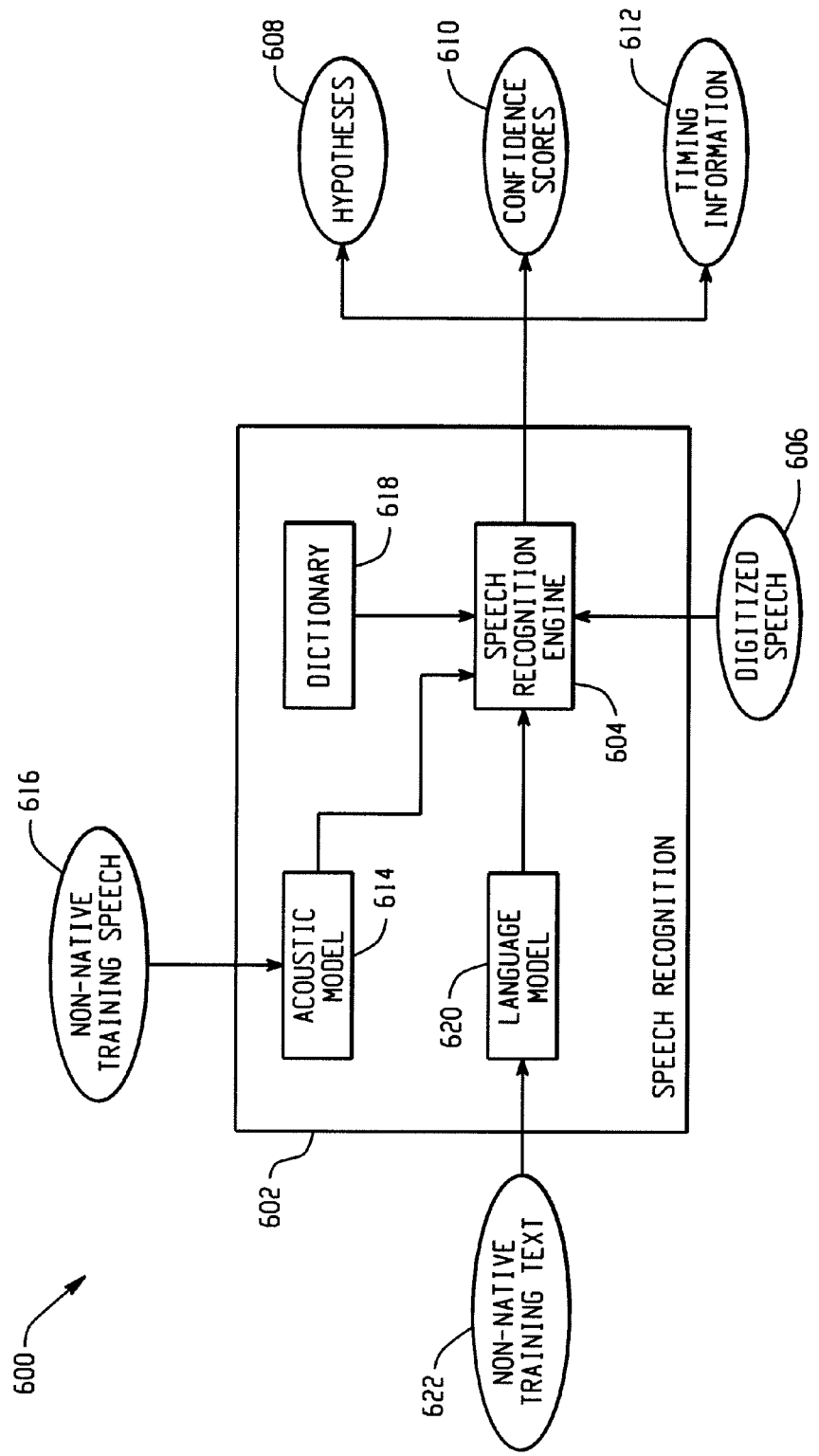
FIG. 6 is a block diagram depicting considerations of an example speech recognition.

FIG. 6 is a block diagram illustrating an exemplary speech recognition system 602. A speech recognition engine 604 receives digitized speech 606 from which to generate word hypotheses 608, confidence scores 610, and timing information 612. The speech recognition engine 604 utilizes an acoustic model 614 trained with non-native training speech 616, a dictionary 618 containing associations between words and their possible pronunciations, and a language model 620 trained based on transcribed non-native training speech and/or other training text 622.

The acoustic model 614 is trained with non-native training speech 616 (i.e., training speech spoken by a non-native language speaker) to recognize phonemes and words within the digitized speech 606. The acoustic model 614 associates probabilities with speech units called phones, which represent a given phoneme. The recognition process divides the digitized speech 606 into intervals (e.g., 10 millisecond intervals or intervals of other durations), and spectral features are extracted for each interval. These spectral features are provided to a statistical model that associates probabilities with each possible phone for that time slice (phone likelihoods).

A variety of statistical models may be utilized. For example, Hidden Markov Models may be utilized for representing each phone. By training with many iterations of each phone in the non-native training speech 616, which may be spoken by one or several non-native speakers, it is possible to account for spectral and temporal variations of the same phone. In one example carried out by the inventors, the acoustic model 614 was a conventional gender-independent fully continuous Hidden Markov Model speech recognizer trained utilizing about 2,000 transcribed spontaneous speech responses from an English Language Practice Test (ELPT) for an English Language Test (ELT).

Each entry in a dictionary 618 containing the words that are expected to be recognized by the system may be expressed as a sequence of Hidden Markov Models representing the phones assumed by that entry. Using the phone likelihoods identified based on the spectral features of the digitized speech 606 and dictionary entries 618 listing combinations of phones that make up words, the speech recognition engine is able to generate an initial hypothesis for each word presented in the digitized speech 606 along with initial confidence scores associated with each word hypothesis. The speech recognition engine 604 may also utilize a language model 620 trained using non-native and/or native training text 622. The language model 620 identifies the probability of an initial word hypothesis for a word being correct based on word hypotheses for surrounding words. For example, while the phrase "are my favorite" may be relatively common in the non-native training text 622, the phrase "are why favorite" is much less common. Thus, the language model 620 can determine that the confidence score 610 for the hypotheses "why" in the set of hypotheses "Cat are why favorite animal" should be relatively low.

The language model 620 may be trained to identify likelihoods of words being spoken based on corpuses of non-native training texts and other documents, such as books, newspapers, magazines, as well as others. For example, probabilities may be identified of observing a given word within a phrase of "n" words (n-grams). Non-native training texts may be selected in order to better model language usage common to non-native speakers, as non-native speaker's syntax and word choice may differ significantly from native speakers. Thus, the use of non-native training text 622 may enable stronger confidence in identification when matched with non-native input speech. In one example carried out by the inventors, a large corpus of about 100 hours of transcribed non-native speech was used in training the language model. That corpus was mixed with a large general-domain language model trained from the Broadcast News corpus (Graff et al., 1997) of the Linguistic Data Consortium (LDC).

Given the phone likelihoods from the acoustic model 614, the speech recognition engine 604 is able to utilize the dictionary 618 to identify a most likely word candidate for a portion of digitized input speech 606. An initial confidence score may be applied based on the magnitude of the phone likelihoods and the quality of the match between the identified phones and a dictionary engine. The speech recognition engine 604 may augment the initial word hypotheses and/or confidence score based on a probability of a word appearing in the string of surrounding word hypotheses. For example, a word hypothesis may be selected that meets the criteria:

$$\text{argmax} P(W | S) = P(S | W) * P(W),$$

$$\underset{w}{\text{argmax}} P(W | S) = P(S | W) P(W),$$

where P(S|W) is the probability from the acoustic model 614 of the likelihood of the signal S, given the transcription W, and P(W) is the probability from the language model 620 based on the probability of observing a given string of words. The word having the highest P(W|S) value is selected as the word hypothesis 608 with a confidence score 610 based on the value of P(W|S). Certain timing information 612 may also be output from the speech recognition 602 such as the length of a response, a number of words in a response, as well as other statistics.

Figure 7:
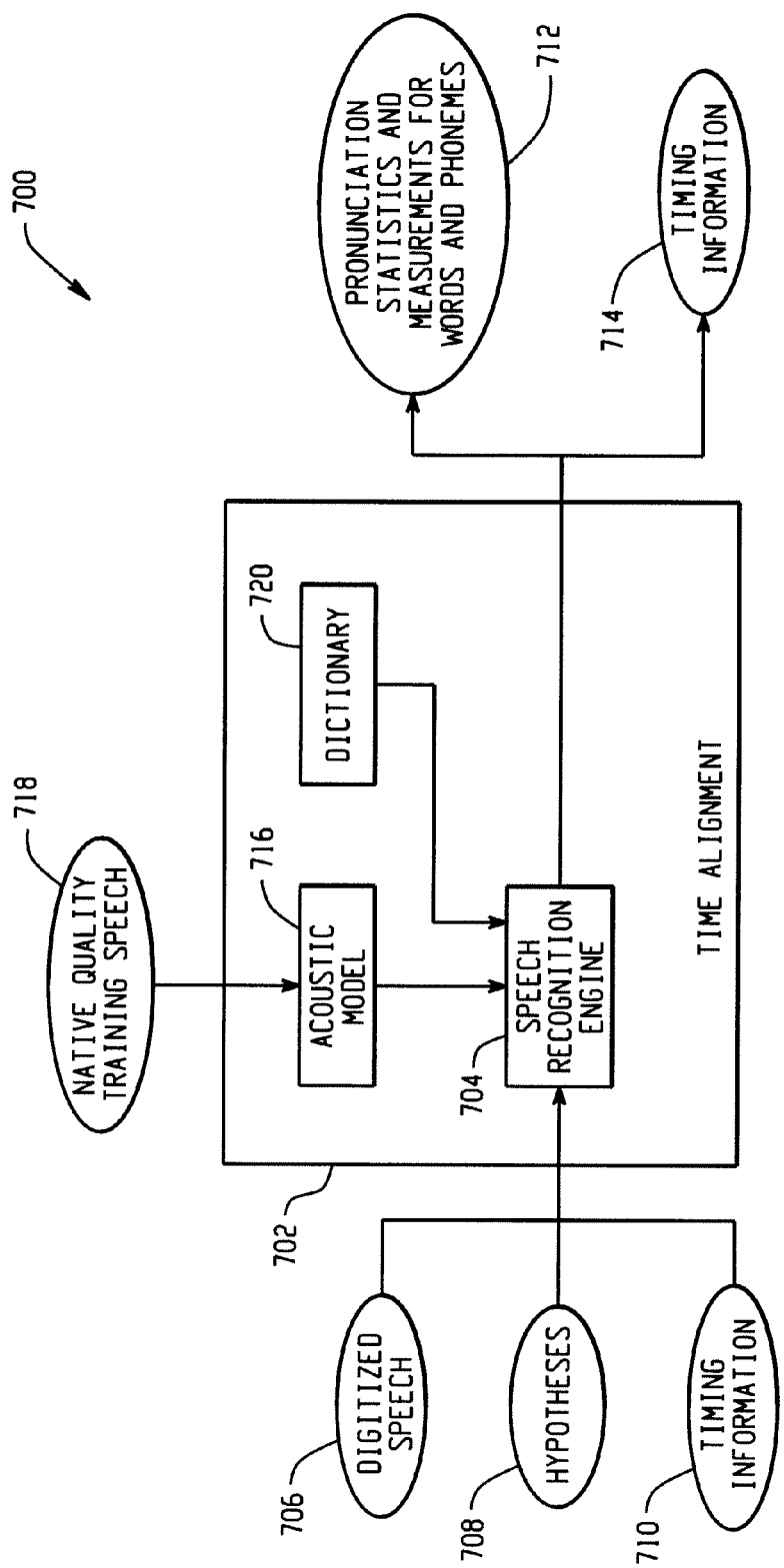
FIG. 7 is a block diagram depicting considerations of an example time alignment.

FIG. 7 is a block diagram illustrating an exemplary alignment system 702. A speech recognition engine 704 receives digitized speech 706 along with word hypotheses 708 for words contained within the digitized speech. The speech recognition engine 704 may also receive timing information, such as the length of the digitized speech 706 as well as other factors. The speech recognition engine 704 generates pronunciation statistics 712 for the words and phonemes contained in the digitized speech 706 and may also provide timing information 714 regarding the digitized speech. The speech recognition engine 704 utilizes an acoustic model 716 trained with native-quality training speech 718 as well as a dictionary 720, which the speech recognition engine 704 uses in generating the pronunciation measurements 712. For example, the speech recognition engine 704 can calculate likelihood estimations of all hypothesized words and vowel durations. For example, likelihoods of the form P(S|W) or emission probabilities of the Hidden Markov Model, can be used for this purpose.

Alignment 702 creates a time-alignment between a string of words (identified in the word hypotheses), as well as their phonemes contained therein, with the digitized speech signal 706. For example, the alignment may result in a list of words or phonemes with their respective start and end times. The alignment process may map the words of the hypotheses to their phoneme sequences based on entries in a dictionary. For example, the word "cat" may be mapped to the sequence: "k ae t," where k, ae, and t are the three phonemes that are part of the standard pronunciation of the word "cat".

A search algorithm may then seek an optimal sequence through the string of phonemes, and may also insert silence phonemes between two words if warranted, given the digitized speech signal 706. For example, for the phrase, "Cat are my favorite animal," "cat" is the first word in the utterance, as identified by the received word hypotheses 708. The speech recognition engine 704 determines, using the dictionary 720, that "k" is the first phoneme in the word cat, and the speech recognition engine 704 searches for a segment in the digitized speech 706 that has acoustic characteristics matching a "k" phoneme immediately followed by the "ae" phoneme further followed by the "t" phoneme. Upon locating the target phoneme in the digitized speech 706, timing information is identified and output. For example, the following data may be output based on the input digitized speech 706 hypothesis 708:

| WORD | PHONEME | START | END (in seconds) |
|------|---------|-------|------------------|
| Cat  |         | 1.20  | 1.80             |
|      | k       | 1.20  | 1.30             |
|      | ae      | 1.30  | 1.60             |
|      | t       | 1.60  | 1.80.            |

Such timing data is useful in making measurements related to the digitized speech. For example, the average length of the speaker's "ae" pronunciations may be calculated and examined and compared to the standard length of an "ae" pronunciation based on native speech.

The acoustic model 716 may be trained on native-quality speech. In one example carried out by the inventors, a generic recognizer provided by a commercial vendor was trained on a large and varied native speech corpus. The acoustic model was adapted using batch-mode MAP adaptation. The adaptation corpus contained about 2,000 responses having high scores in previous ELPT tests. The acoustic model 716 was used to obtain the estimation of standard average vowel durations on native speech data. The native speech data was force aligned to identify durations of all phonemes. This data was utilized to calculate the average duration of each vowel, which was output as a pronunciation measurement 712.

Figure 8:
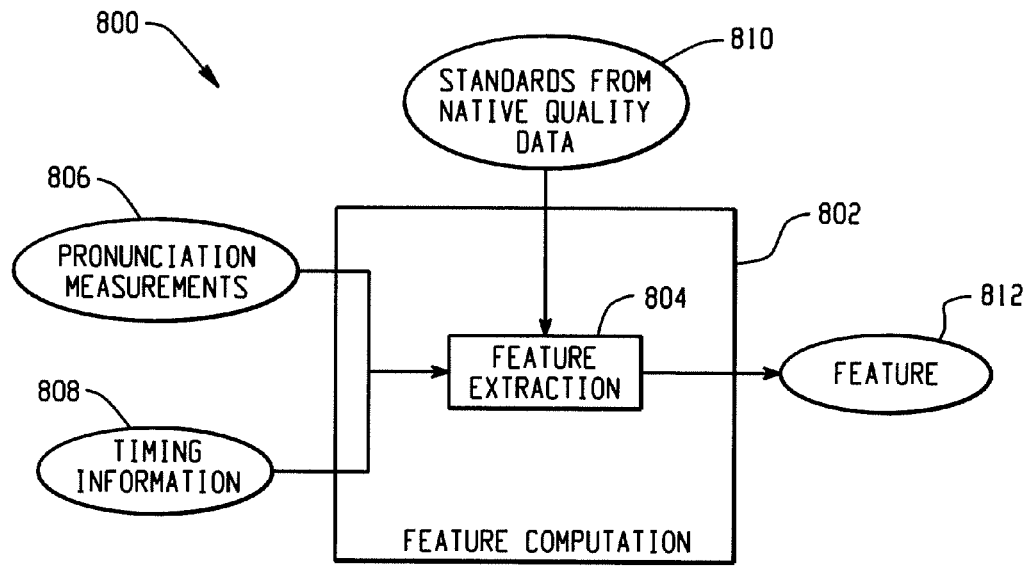
FIG. 8 is a block diagram depicting considerations of an example feature computation.

FIG. 8 is a block diagram illustrating an exemplary feature computation system 802. A feature extraction 804 is performed based on received pronunciation measurements 806 and timing information 808 as well as standard (i.e., typical) values of linguistic parameters such as vowel duration, consonant duration, spectral features, etc., based on native-quality speech data 810 to generate features 812 used for producing an assessment score. Some example features that may be calculated are listed in FIG. 4A. Certain features, such as the likelihood of a word being spoken $L(x_i)$ and the average likelihood across all words $L_1/n$ may be calculated based on the pronunciation measurements 806 and timing information 808 without consideration of standard (typical) values from native-quality speech data. Other features are based on standard (typical) values of native-quality speech data 810. For example, the duration shift for a vowel $S_{v_j}$ is based on the absolute value of the difference between the duration of vowel $v_i$ and its standard (i.e., typical) value from native-quality speech data.

Figure 9:
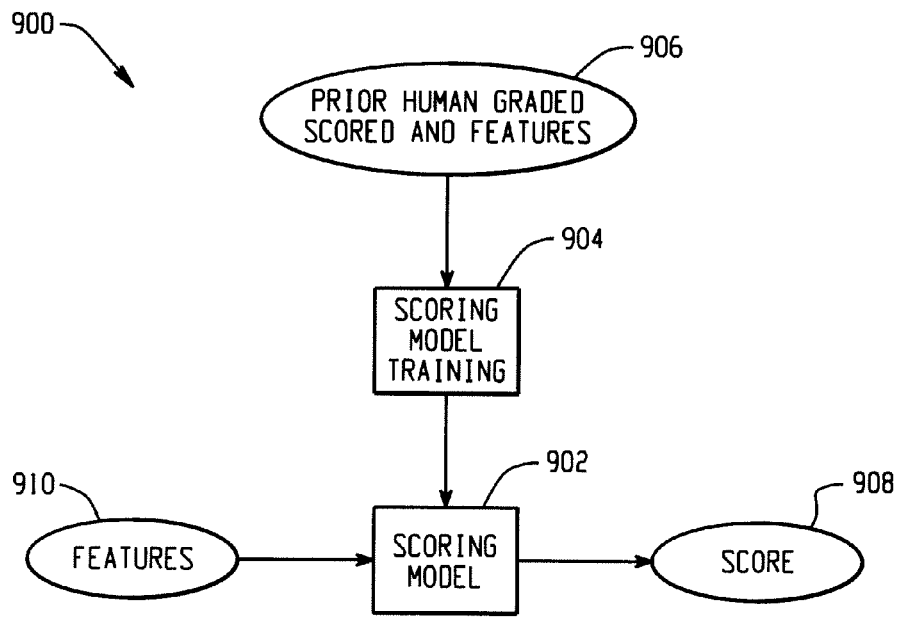
FIG. 9 is a block diagram depicting the generation of an assessment score based on calculated features.

FIG. 9 is a block diagram depicting the generation of an assessment score based on calculated features. A scoring model 902 can be trained 904 based on features of speech responses from prior language tests and associated scores 906. For example, a data set may be received that identifies, for a number of prior speech evaluations, features such as those in FIG. 4 for the evaluation and the respective human grader's score for the evaluation. Based on that data set, correlations may be calculated for each feature in the data set and the human grader's scores. Features having high correlations with the human grader's scores can be used to score pronunciation proficiency better. In one example carried out by the inventors, features L3, L6, and L7, depicted in FIG. 4, were found to have absolute value of Pearson correlation with human holistic scores values (|r|) of greater than 0.45. In addition the average normalized vowel duration shifts, $\overline{S}_n$, had an |r| value greater than 0.35. Thus, in one example, the scoring model 902 may be trained using a multiple regression technique based on the L3, L6, L7, and $\overline{S}_n$ features and the associated human grader's score for each speech response of a prior speech test.

After the scoring model 902 has been trained, assessment scores 908 may be generated based on received features 910. For example, one or more features 910 may be received at the scoring model 902. The trained scoring model 902 may have a set of coefficients for respective received features 910. Each of the received features 910 may be multiplied by the feature's respective coefficient and those products may be summed to generate a pronunciation assessment score 908.

The pronunciation assessment score 908 may be a final output score, or the pronunciation assessment score 908 may be a part of a composite score for a non-native speech exam. For example, the pronunciation assessment 908 may be combined with other scores such as a related word stress score, an intonation score, a vocabulary score, and/or a grammar score to generate an overall score. The overall score may be reported to the test taker, an instructor, or other interested parties. The component scores, such as the pronunciation assessment 908, may also be reported to identify areas that should be concentrated upon for further improvement.

Figure 10:
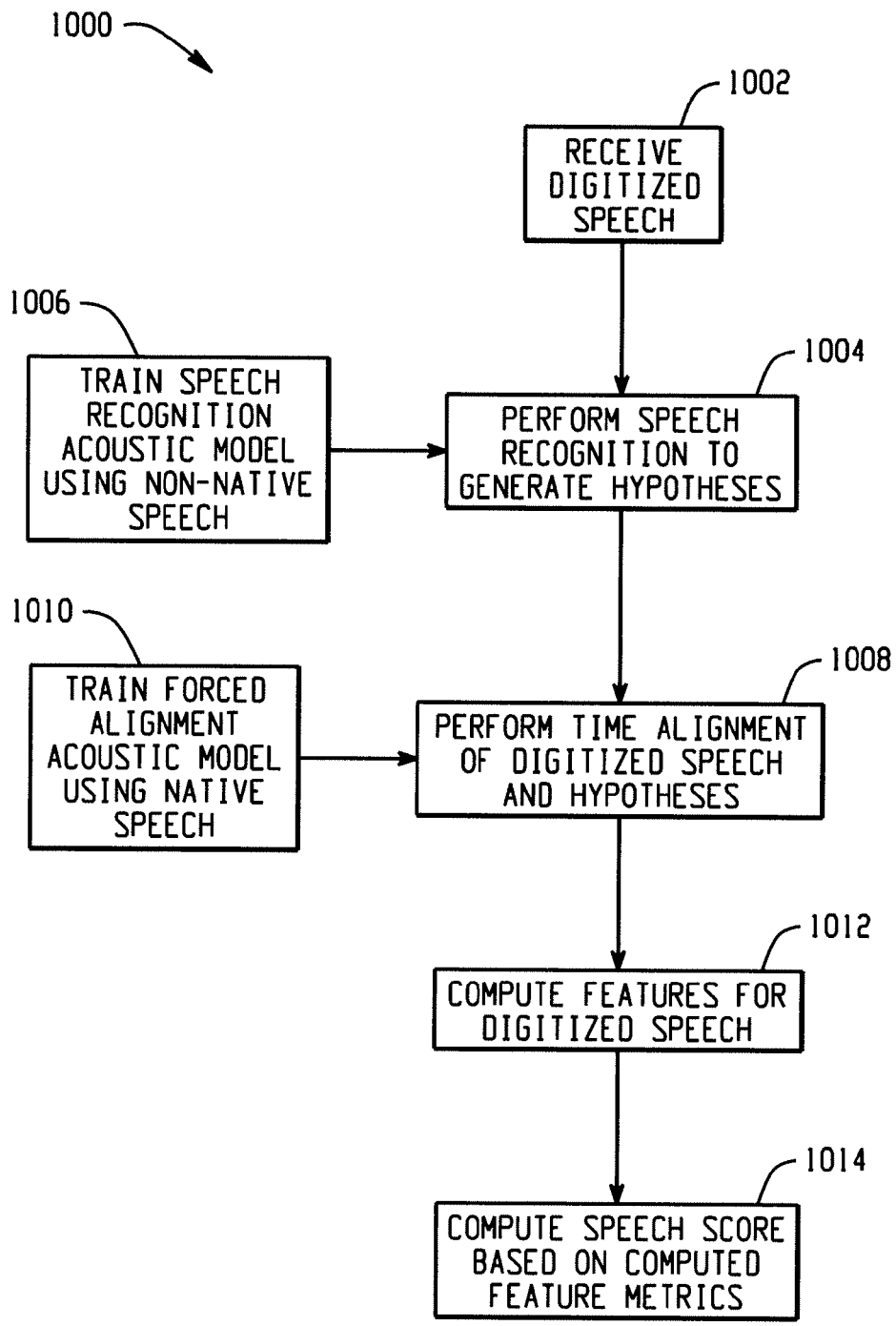
FIG. 10 is a flow diagram depicting an example computer-implemented generation of a speech score.

FIG. 10 is a flow diagram depicting an example computer-implemented generation of a speech score. Digitized speech is received at 1002, and a speech recognition is performed at 1004 to generate a set of word hypotheses using an acoustic model trained using non-native speech at 1006. A time alignment is performed at 1008 that aligns the digitized speech and the hypotheses using an acoustic model trained at 1010 using native-quality speech. The time alignment calculates statistics regarding individual words and phonemes in the word hypotheses. Those statistics are utilized at 1012 to calculate features for the digitized speech. The features are utilized to calculate an assessment score at 1014 that can be stored in a computer-readable memory.

Figure 11:
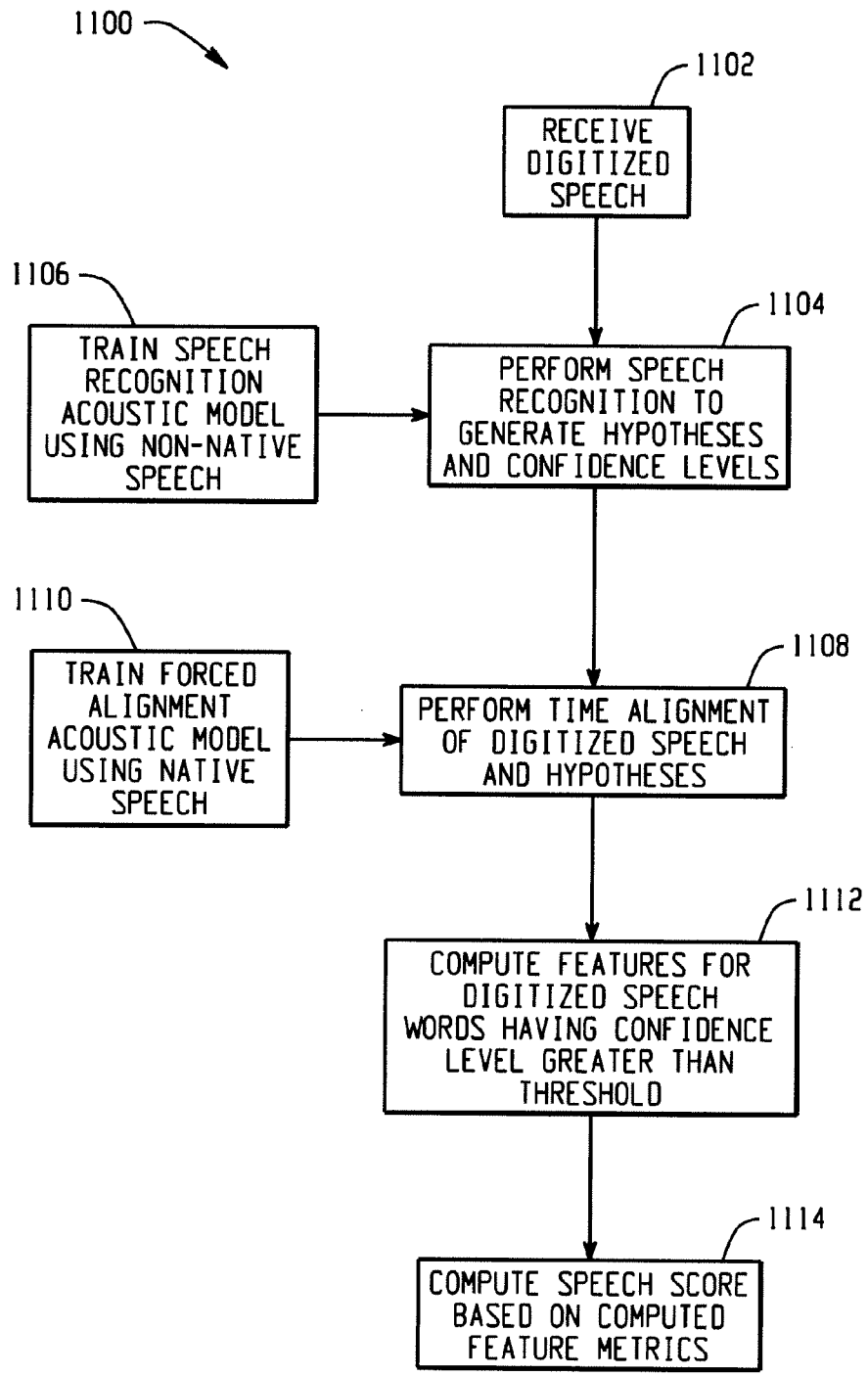
FIG. 11 is a flow diagram depicting an example computer-implemented generation of a speech score using speech recognition filtering.

FIG. 11 is a flow diagram depicting an example computer-implemented generation of a speech score using speech recognition filtering. Digitized speech is received at 1102, and a speech recognition is performed at 1104 to generate a set of word hypotheses using an acoustic model trained using non-native speech at 1106. The speech recognition at 1104 also generates confidence levels for each word hypothesis. The confidence level identifies a likelihood that the word in the word hypothesis was correctly recognized. A time alignment is performed at 1108 that aligns the digitized speech and the hypotheses using an acoustic model trained at 1110 using native-quality speech. The time alignment calculates statistics regarding individual words and phonemes in the word hypotheses. Those statistics are utilized at 1112 to calculate features for the digitized speech. The assessment generation may only calculate features for words having a confidence level greater than a threshold level. Such a filtering may improve assessment score calculation quality by avoiding improperly penalizing exam takers based on mistakes in word recognition. The calculated features are utilized to calculate an assessment score at 1114 that can be stored in a computer-readable memory.

In addition to assessing pronunciation proficiency, a non-native speech assessment engine may be used in a larger context of an assessment system for a broader construct such as communicative competence or more generally speaking proficiency. In such a case, in addition to features described herein, features relating to word stress, intonation, vocabulary use, grammar, or other linguistic dimensions can be used in addition to pronunciation proficiency to compute a score indicative of such a broader construct of speech proficiency.

Figure 12A:
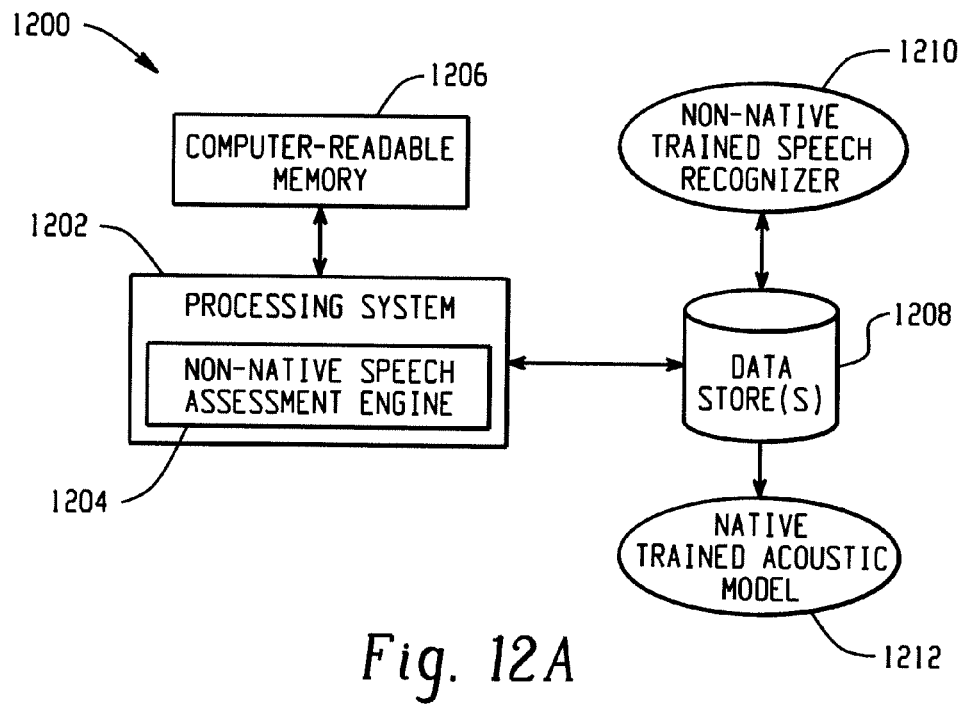
FIGS. 12A, 12B, and 12C depict example systems for use in implementing a non-native speech assessment engine.
Figure 12B:
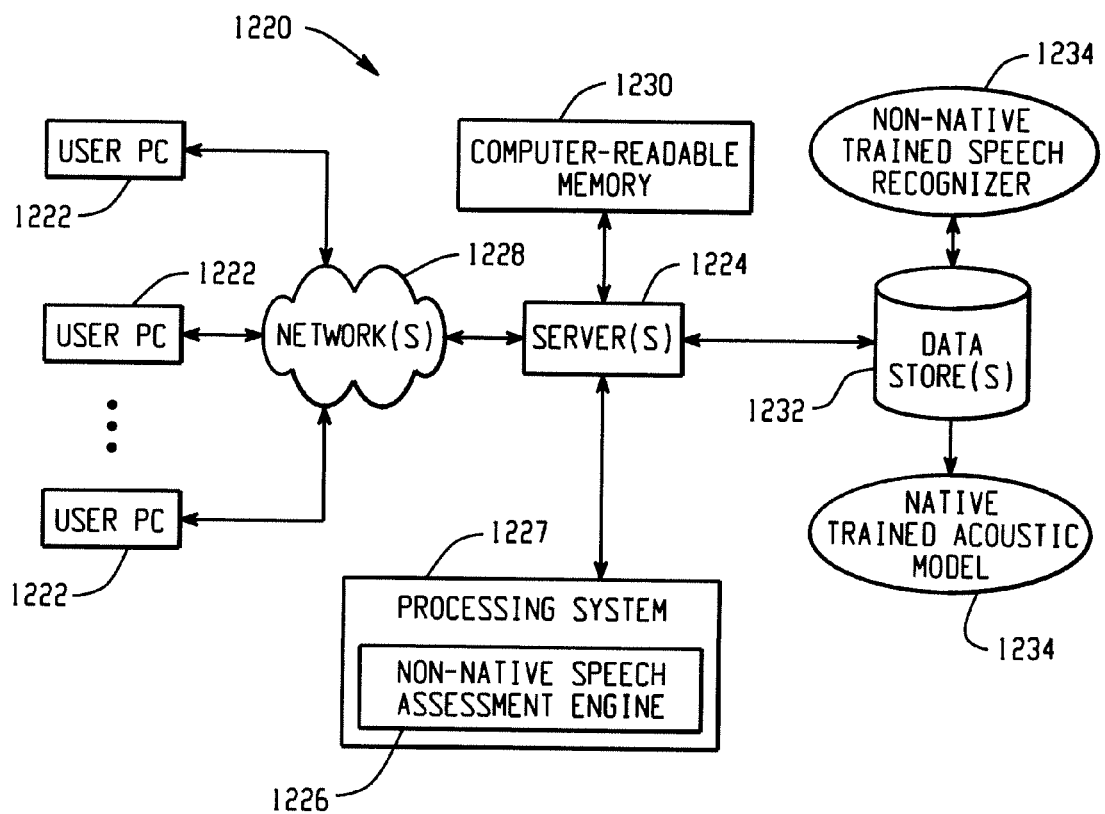
Figure 12C:
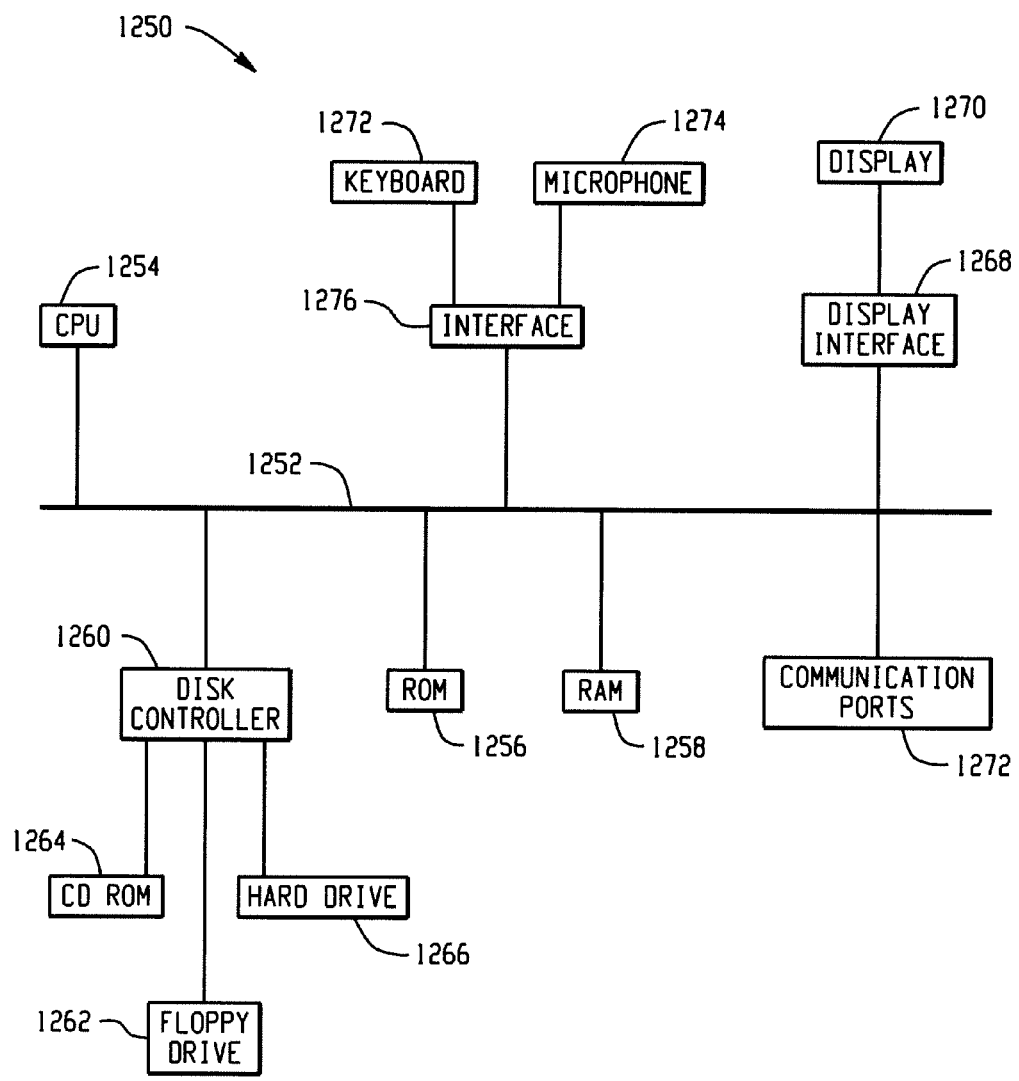

FIGS. 12A, 12B, and 12C depict example systems for use in implementing speech assessment engine for assessing speech (e.g., spontaneous speech) from a non-native language speaker. For example, FIG. 12A depicts an exemplary system 1200 that includes a stand alone computer architecture where a processing system 1202 (e.g., one or more computer processors) includes a non-native speech assessment engine 1204 being executed on it. The processing system 1202 has access to a computer-readable memory 1206 in addition to one or more data stores 1208. The one or more data stores 1208 may contain computer program code for implementing a non-native trained speech recognizer 1210 as well as computer readable program code for implementing a native trained acoustic model 1212.

FIG. 12B depicts a system 1220 that includes a client server architecture. One or more user PCs 1222 accesses one or more servers 1224 running a non-native speech assessment engine 1226 on a processing system 1227 via one or more networks 1228. The one or more servers 1224 may access a computer readable memory 1230 as well as one or more data stores 1232. The one or more data stores 1232 may contain a non-native trained speech recognizer 1234 as well as a native trained acoustic model 1236.

FIG. 12C shows a block diagram of exemplary hardware for a stand alone computer architecture 1250, such as the architecture depicted in FIG. 12A, that may be used to contain and/or implement the program instructions of exemplary embodiments. A bus 1252 may serve as the information highway interconnecting the other illustrated components of the hardware. A processing system 1254 labeled CPU (central processing unit) (e.g., one or more computer processors), may perform calculations and logic operations required to execute a program. A processor-readable storage medium, such as read only memory (ROM) 1256 and random access memory (RAM) 1258, may be in communication with the processing system 1254 and may contain one or more programming instructions for performing the method of implementing a non-native speech assessment engine. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 1260 interfaces one or more optional disk drives to the system bus 1252. These disk drives may be external or internal floppy disk drives such as 1262, external or internal CD-ROM, CD-R, CD-RW or DVD drives such as

1264, or external or internal hard drives 1266. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1260, the ROM 1256 and/or the RAM 1258. Preferably, the processor 1254 may access each component as required.

A display interface 1268 may permit information from the bus 1256 to be displayed on a display 1270 in audio, graphic, or alphanumeric format. Communication with external devices may optionally occur using various communication ports 1272.

In addition to the standard computer-type components, the hardware may also include data input devices, such as a keyboard 1272, or other input device 1274, such as a microphone, remote control, pointer, mouse and/or joystick.

The invention has been described with reference to particular exemplary embodiments. However, it will be readily apparent to those skilled in the art that it is possible to embody the invention in specific forms other than those of the exemplary embodiments described above. The embodiments are merely illustrative and should not be considered restrictive. The scope of the invention is reflected in the claims, rather than the preceding description, and all variations and equivalents which fall within the range of the claims are intended to be embraced therein.

For example, the systems and methods may utilize data signals conveyed via networks (e.g., local area network, wide area network, interne, combinations thereof, etc.), fiber optic medium, modulated carrier waves, wireless networks, etc. for communication with one or more data processing devices. The data signals can carry any or all of the data disclosed herein that is provided to or from a device. Additionally, the methods and systems described herein may be implemented on many different types of processing devices by computer program code comprising program instructions that are executable by a processing system. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The data (e.g., associations, mappings, data input, data output, intermediate data results, final data results, etc.) received and processed may be stored and implemented in one or more different types of computer-implemented data stores, such as different types of computer-readable storage devices (e.g., RAM, ROM, Flash memory, magnetic disks, optical disks, etc.) and programming constructs (e.g., flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. Software operation can be implemented, for example, as a subroutine unit of code, a software function unit of code, an object (as in an object-oriented paradigm), an applet, or in a computer script language, or as another type of computer code. The software components and/or functionality may be located on a single computer or distributed across multiple computers in communication with one another depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method of assessing spontaneous speech pronunciation, comprising:
    performing speech recognition on digitized speech using a non-native acoustic model trained with non-native speech using a processor to generate word hypotheses for the digitized speech;
    performing time alignment between the digitized speech and the word hypotheses utilizing a reference acoustic model trained with native-quality speech to associate the word hypotheses with corresponding sounds of the digitized speech;
    calculating statistics regarding individual words and phonemes of the word hypotheses using the processor based on said alignment;
    calculating a plurality of features for use in assessing pronunciation of the digitized speech based on the statistics using the processor;
    calculating an assessment score based on one or more of the calculated features; and
    storing the assessment score in a computer-readable memory.

2. The method of claim 1 further comprising excluding words not reliably recognized in generating the word hypotheses from contributing to the assessment score.

3. The method of claim 2, wherein a confidence level is associated with each word in the word hypotheses identifying a likelihood that a word in a word hypothesis was correctly recognized in generating the word hypotheses.

4. The method of claim 3, wherein words having corresponding word hypotheses that do not meet a confidence threshold are not considered in calculating the assessment score.

5. The method of claim 1 wherein the features are based on at least one of: Hidden Markov Model probabilities, average phoneme duration, average word duration, phoneme duration distribution, word duration distribution, energy measurements, energy distributions, pitch measurements, pitch distributions, and pitch contours.

6. The method of claim 1 wherein speech samples are scored by a human, and a statistical model is built using the features and human scores;
    wherein the assessment score is based on the scoring model and one or more of the calculated features.

7. The method of claim 6, wherein the statistical model is built using multiple regression.

8. The method of claim 1, wherein the reference acoustic model is trained with only native speech.

9. The method of claim 1, wherein generating word hypotheses utilizes the non-native acoustic model, a dictionary that maps pronunciations to words, and a language model that identifies a likelihood that a word will follow a sequence of already hypothesized words in a speech recording.

10. The method of claim 9, wherein the language model is an n-gram language model.

11. The method of claim 1, wherein the assessment score is based on one or more features selected from the group consisting of:

an average likelihood across all letters: $L_1/m$, where $L_1$ is a summation of likelihoods of all individual words:

$$L_1 = \sum_{i=1}^{n} L(x_i),$$

where $L(x_i)$ is a likelihood of word $x_i$ being spoken given an observed audio signal, where n is a number of words in a response, where m is a number of letters in the response;

an average likelihood across all words: $L_1/n$;

an average likelihood per second normalized by a rate of speech: $L_4/R$, where $L_4=L_1/T$, where T is the summation of a duration of all words in the response, where $R=m/T_s$, where $T_s$ is a duration of the response;

an average likelihood density across all words normalized by a rate of speech, $L_5/R$, where $$L_5 = \frac{\sum_{i=1}^{n} \frac{L(x_i)}{t_i}}{n},$$

where $t_i$ is a duration of word i in a response;

an average vowel duration shift:

$$\overline{S} = \frac{\sum_{i=1}^{N_v} S_{v_i}}{N_v},$$

where $N_v$ is a total number of vowels, where $S_{v_i}$ is the duration shift of vowel $v_i$, which is measured as an absolute value of the difference between a duration of vowel $v_i$ and a standard value of a duration of a vowel estimated on native speech data, where $S_{v_i}=|P_{v_i}-D_{v_i}|$, where $P_{v_i}$ is the duration of vowel $v_i$ and $D_{v_i}$ is the standard average duration of vowel $v_i$; and an average normalized vowel duration shifts:

$$\overline{Sn} = \frac{\sum_{i=1}^{N_v} Sn_{v_i}}{N_v},$$

where $Sn_{v_i}$ is a normalized duration shift of vowel $v_i$, which is measured as an absolute value of a normalized difference between a duration of vowel $v_i$ and a standard value of a duration of a vowel estimated on the native speech data, where $Sn_{v_i}$ is calculated as $$\left|\frac{P_{v_i}}{\overline{P}} - \frac{D_{v_i}}{\overline{D}}\right|,$$

where $P_{v_i}$ is the duration of vowel $v_i$, $\overline{P}$ is an average vowel duration across all vowels in the response being scored, $D_{v_i}$ is a standard average duration of vowel $v_i$, and $\overline{D}$ is a standard vowel duration estimated on all vowels in native speech data.

12. The method of claim 1, wherein one or more of the features are utilized with related stress, intonation, vocabulary, or grammar to generate the assessment score indicating communicative competence or other construct of speaking proficiency that includes pronunciation proficiency.

13. The method of claim 1, wherein second statistics derived from native-quality speech are utilized in calculating the plurality of features.

14. A computer-implemented system for assessing spontaneous speech pronunciation, comprising:
 a processor;
 a non-transitory computer-readable memory comprising instructions for causing the processor to perform steps including:
  performing speech recognition on digitized speech using a non-native acoustic model trained with non-native speech to generate word hypotheses for the digitized speech;
  performing time alignment between the digitized speech and the word hypotheses utilizing a reference acoustic model trained with native-quality speech to associate the word hypotheses with corresponding sounds of the digitized speech;
  calculating statistics regarding individual words and phonemes of the word hypotheses based on said alignment;
  calculating a plurality of features for use in assessing pronunciation of the speech based on the statistics;
  calculating an assessment score based on one or more of the calculated features; and
  storing the assessment score in a computer-readable memory.

15. The system of claim 14 wherein the steps further comprise excluding words not reliably recognized in generating the word hypotheses from contributing to the assessment score.

16. The system of claim 15, wherein a confidence level is associated with each word in the word hypotheses identifying a likelihood that a word in a word hypothesis was correctly recognized in generating the word hypotheses.

17. The system of claim 16, wherein words having corresponding hypotheses that do not meet a confidence threshold are not considered in calculating the assessment score.

18. The system of claim 14 wherein the features are based on at least one of: Hidden Markov Model probabilities, average phoneme duration, average word duration, phoneme duration distribution, word duration distribution, energy measurements, energy distribution, pitch measurements, pitch distribution, and pitch contours.

19. The system of claim 14 wherein speech samples are scored by a human, and a statistical model is built using the features and human scores;
 wherein the assessment score is based on the scoring model and one or more of the calculated features.

20. The system of claim 19, wherein the statistical model is built using multiple regression.

21. The system of claim 14, wherein the reference acoustic model is trained with only native speech.

22. The system of claim 14, wherein generating word hypotheses utilizes the non-native acoustic model, a dictionary that maps pronunciations to words, and a language model that identifies a likelihood that a word will follow a sequence of already hypothesized words in a speech recording.

23. The system of claim 22, wherein the language model is an n-gram language model.

24. The system of claim 14, wherein the assessment score is based on one or more features selected from the group consisting of:
an average likelihood across all letters: $L_1/m$, where $L_1$ is a summation of likelihoods of all individual words:

$$L_1 = \sum_{i=1}^{n} L(x_i),$$

where $L(x_i)$ is a likelihood of word $x_i$ being spoken given an observed audio signal, where n is a number of words in a response, where m is a number of letters in the response;
an average likelihood across all words: $L_1/n$;
an average likelihood per second normalized by a rate of speech: $L_4/R$, where $L_4=L_1/T$, where T is the summation of a duration of all words in the response, where $R=m/T_s$, where $T_s$ is a duration of the response;
an average likelihood density across all words normalized by a rate of speech, $L_5/R$, where $$L_5 = \frac{\sum_{i=1}^{n} \frac{L(x_i)}{t_i}}{n},$$

where $t_i$ is a duration of word i in a response;
an average vowel duration shift:

$$\overline{S} = \frac{\sum_{i=1}^{N_v} S_{v_i}}{N_v},$$

where $N_v$ is a total number of vowels, where $S_{v_i}$ where is the duration shift of vowel $v_i$, which is measured as an absolute value of the difference between a duration of vowel $v_i$ and a standard value of a duration of a vowel estimated on native speech data, where $S_{v_i}=|P_{v_i}-D_{v_i}|$, where $P_{v_i}$ is the duration of vowel $v_i$ and $D_{v_i}$ is the standard average duration of vowel $v_i$; and
an average normalized vowel duration shifts:

$$\overline{Sn} = \frac{\sum_{i=1}^{N_v} Sn_{v_i}}{N_v},$$

where $Sn_{v_i}$ is a normalized duration shift of vowel $v_i$, which is measured as an absolute value of a normalized difference between a duration of vowel $v_i$ and a standard value of a duration of a vowel estimated on the native speech data, where $Sn_{v_i}$ is calculated as $$\left| \frac{P_{v_i}}{P} - \frac{D_{v_i}}{D} \right|,$$

where $P_{v_i}$ is the duration of vowel $v_i$, $\overline{P}$ is an average vowel duration across all vowels in the response being scored, $D_{v_i}$ is a standard average duration of vowel $v_i$, and $\overline{D}$ is a standard vowel duration estimated on all vowels in native speech data.

25. The system of claim 14, wherein one or more of the features are utilized with related stress, intonation, vocabulary, or grammar to generate the assessment score indicating communicative competence or other construct of speaking proficiency that includes pronunciation proficiency.

26. The system of claim 14, wherein second statistics derived from native-quality speech are utilized in calculating the plurality of features.

27. A non-transitory computer-readable memory comprising computer-readable instructions, which when executed cause a processor to perform steps comprising:
performing speech recognition on digitized speech using a non-native acoustic model trained with non-native speech to generate word hypotheses for the digitized speech;
performing time alignment between the digitized speech and the word hypotheses utilizing a reference acoustic model trained with native-quality speech;
calculating statistics regarding individual words and phonemes of the word hypotheses based on said alignment;
calculating a plurality of features for use in assessing pronunciation of the speech based on the statistics;
calculating an assessment score based on one or more of the calculated features; and
storing the assessment score in a computer-readable memory.

28. The method of claim 1, wherein the digitized speech is spontaneous, non-native speech of a non-native language speaker.

29. The system of claim 14, wherein the digitized speech is spontaneous, non-native speech of a non-native language speaker.

30. The non-transitory computer-readable memory of claim 27, wherein the instructions cause the processor to perform steps comprising:
excluding words not reliably recognized in generating the word hypotheses from contributing to the assessment score.

31. The non-transitory computer-readable memory of claim 30, wherein a confidence level is associated with each word in the word hypotheses identifying a likelihood that a word in a word hypothesis was correctly recognized in generating the word hypotheses.

32. The non-transitory computer-readable memory of claim 31, wherein words having corresponding word hypotheses that do not meet a confidence threshold are not considered in calculating the assessment score.

33. The non-transitory computer-readable memory of claim 27, wherein the features are based on at least one of: Hidden Markov Model probabilities, average phoneme duration, average word duration, phoneme duration distribution, word duration distribution, energy measurements, energy distributions, pitch measurements, pitch distributions, and pitch contours.

34. The non-transitory computer-readable memory of claim 27, wherein speech samples are scored by a human, and a statistical model is built using the features and human scores;
    wherein the assessment score is based on the scoring model and one or more of the calculated features.

35. The non-transitory computer-readable memory of claim 34, wherein the statistical model is built using multiple regression.

36. The non-transitory computer-readable memory of claim 27, wherein the reference acoustic model is trained with only native speech.

37. The non-transitory computer-readable memory of claim 27, wherein generating word hypotheses utilizes the non-native acoustic model, a dictionary that maps pronunciations to words, and a language model that identifies a likelihood that a word will follow a sequence of already hypothesized words in a speech recording.

38. The non-transitory computer-readable memory of claim 37, wherein the language model is an n-gram language model.

39. The non-transitory computer-readable memory of claim 27, wherein the assessment score is based on one or more features selected from the group consisting of:
    an average likelihood across all letters: $L_1/m$, where $L_1$ is a summation of likelihoods of all individual words:

$$L_1 = \sum_{i=1}^{n} L(x_i),$$

where $L(x_i)$ is a likelihood of word $x_i$ being spoken given an observed audio signal, where n is a number of words in a response, where m is a number of letters in the response;
an average likelihood across all words: $L_1/n$;
an average likelihood per second normalized by a rate of speech: $L_4/R$, where $L_4=L_1/T$, where T is the summation of a duration of all words in the response, where $R=m/T_s$, where $T_s$ is a duration of the response;
an average likelihood density across all words normalized by a rate of speech, $L_5/R$, where $$L_5 = \frac{\sum_{i=1}^{n} \frac{L(x_i)}{t_i}}{n},$$

where $t_i$ is a duration of word i in a response;
an average vowel duration shift:

$$\overline{S} = \frac{\sum_{i=1}^{N_v} S_{v_i}}{N_v},$$

where $N_v$ is a total number of vowels, where $S_{v_i}$ is the duration shift of vowel $v_i$, which is measured as an absolute value of the difference between a duration of vowel $v_i$ and a standard value of a duration of a vowel estimated on native speech data, where $S_{v_i}=|P_{v_i}-D_{v_i}|$, where $P_{v_i}$ is the duration of vowel $v_i$ and $D_{v_i}$ is the standard average duration of vowel $v_i$; and
an average normalized vowel duration shifts:

$$\overline{Sn} = \frac{\sum_{i=1}^{N_v} Sn_{v_i}}{N_v},$$

where $Sn_{v_i}$ is a normalized duration shift of vowel $v_i$, which is measured as an absolute value of a normalized difference between a duration of vowel $v_i$ and a standard value of a duration of a vowel estimated on the native speech data, where $Sn_{v_i}$ is calculated as $$\left| \frac{P_{v_i}}{\overline{P}} - \frac{D_{v_i}}{\overline{D}} \right|,$$

where $P_{v_i}$ is the duration of vowel $v_i$, $\overline{P}$ is an average vowel duration across all vowels in the response being scored, $D_{v_i}$ is a standard average duration of vowel $v_i$, and $\overline{D}$ is a standard vowel duration estimated on all vowels in native speech data.

40. The non-transitory computer-readable memory of claim 27, wherein one or more of the features are utilized with related stress, intonation, vocabulary, or grammar to generate the assessment score indicating communicative competence or other construct of speaking proficiency that includes pronunciation proficiency.

41. The non-transitory computer-readable memory of claim 27, wherein second statistics derived from native-quality speech are utilized in calculating the plurality of features.

42. The non-transitory computer-readable memory of claim 27, wherein the digitized speech is spontaneous, non-native speech of a non-native language speaker.

* * * * *